(12) United States Patent
Heddaya et al.

(10) Patent No.: US 6,892,218 B2
(45) Date of Patent: *May 10, 2005

(54) EXTENDING NETWORK SERVICES USING MOBILE AGENTS

(75) Inventors: Abdelsalam A. Heddaya, Lexington, MA (US); Kevin T. Lewis, Boston, MA (US); Sulaiman A. Mirdad, Boston, MA (US); David J. Yates, Norwood, MA (US); Ian C. Yates, Boston, MA (US)

(73) Assignee: Certeon, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/662,990

(22) Filed: Sep. 15, 2003

(65) Prior Publication Data

US 2004/0153499 A1 Aug. 5, 2004

Related U.S. Application Data

(63) Continuation of application No. 09/404,776, filed on Sep. 24, 1999, now Pat. No. 6,622,157.
(60) Provisional application No. 60/102,121, filed on Sep. 28, 1998.

(51) Int. Cl.[7] ............................ G06F 15/16; G06F 9/00; H04L 12/28
(52) U.S. Cl. ........................ 709/202; 370/401; 709/238; 718/105
(58) Field of Search ................................ 709/202, 238; 718/105; 370/401

(56) References Cited

U.S. PATENT DOCUMENTS 5,748,897 A 5/1998 Katiyar
5,774,660 A 6/1998 Brendel et al.

(Continued)

FOREIGN PATENT DOCUMENTS

WO 98/17039 4/1998

OTHER PUBLICATIONS

Yemini, Y., et al., "Towards Programmable Networks," *IFIP/IEEE International Workshop on Distributed Systems: Operations and Management*, Oct. 1996, XP002130605.

Bauman, J., et al., "Mole–Concepts of a Mobile Agent System," *World Wide Web*, 1998, Baltzer, Netherlands, 1:3, pp. 123–137, XP002130606.

Heddaya, A., et al., "WebWave: Globally Load Balanced Fully Distributed Caching of Hot Published Documents," *International Conference On Distributed Computing Systems*, XX, XX, pp. 160–168, XP002075421.

Mourad, A., et al., "Scalable Web Server Architectures," *Proceedings IEEE Symposium On Computers and Communications*, Jul. 1, 1997, SP000100852, Abstract.

*Primary Examiner*—David Wiley
*Assistant Examiner*—George C. Neurauter, Jr.
(74) *Attorney, Agent, or Firm*—Goodwin Procter, LLP

(57) ABSTRACT

A technique fulfills service requests in a system of computers that communicate as nodes within a network. The technique involves sending, in response to an initial service request that requests a service provided by a primary server node, a mobile agent from the primary server node to an intermediate node. The mobile agent indicates to the intermediate node that a secondary server node is capable of providing the service. The technique further involves intercepting, at the intermediate node, a subsequent service request sent from a client node to the primary server node, the subsequent service request requesting the service, and sending an instruction from the intermediate node to the secondary server node. The instruction instructs the secondary server node to provide the service. The technique further includes providing, in response to the instruction, the service from the secondary server node to the client node.

13 Claims, 7 Drawing Sheets

U.S. PATENT DOCUMENTS

| | | |
|---|---|---|
| 5,850,517 A | 12/1998 | Verkler et al. |
| 6,014,698 A | 1/2000 | Griffiths |
| 6,055,562 A | 4/2000 | Devarakonda et al. |
| 6,128,660 A | 10/2000 | Grimm et al. |
| 6,148,327 A | 11/2000 | Whitebread et al. |
| 6,157,941 A | 12/2000 | Verkler et al. |
| 6,173,311 B1 | 1/2001 | Hassett et al. |
| 6,175,869 B1 | 1/2001 | Ahuja et al. |
| 6,249,801 B1 | 6/2001 | Zisapel et al. |
| 6,256,771 B1 | 7/2001 | O'Neill et al. |
| 6,279,001 B1 | 8/2001 | DeBettencourt et al. |
| 6,317,794 B1 | 11/2001 | Papierniak et al. |
| 6,327,622 B1 | 12/2001 | Jindal et al. |
| 6,473,791 B1 | 10/2002 | Al-Ghosein et al. |
| 6,622,157 B1 * | 9/2003 | Heddaya et al. ............ 709/202 |

* cited by examiner

EXTENDING NETWORK SERVICES USING MOBILE AGENTS

RELATED APPLICATIONS

This application is a continuation of U.S. application Ser. No. 09/404,776, filed Sep. 24, 1999, now U.S. Pat. No. 6,622,157, which claims the benefit of U.S. provisional application Ser. No. 60/102,121 filed Sep. 28, 1998, the entire teachings of which are incorporated herein by reference.

BACKGROUND

Computer networks, such as the Internet, private intranets, extranets, and virtual private networks, are increasingly being used for a variety of endeavors including the storage and retrieval of information, communication, electronic commerce, entertainment, and other applications. In these networks certain computers, known as servers or home servers, are used to provide some type of service such as access to information (e.g., data or programs) stored in various computer file formats but generically referred to herein as a "document". While in the Internet the documents are typically primarily composed of text and graphics, each such document can actually be a highly formatted computer file containing data structures that are a repository for a variety of information including text, tables, graphic images, sounds, motion pictures, animations, computer program code, and/or many other types of digitized information.

Other computers in the network, known as clients, receive the services provided by the servers. Often a client obtains a service by sending a service request to the home server. For example, a client may obtain access to a document by requesting that a copy be sent by the home server over the network to the client.

In general, when a client requests a service from a home server, the client provides service information to the home server. By way of example, when the service is access to a document, each document typically has an address by which it can be referenced. In the context of the Internet and within the communication protocol known as Hyper Text Transfer Protocol (HTTP), the address is typically an alphanumeric string, known as a Uniform Resource Locator (URL), that specifies (a) an address of the home server from which to obtain the information in the form of a name or a numerical address, and (b) a local information text string that identifies the information requested by the client, which may be a file name, a search request, or other identification.

After the user specifies a URL to the client computer, the address portion of the URL is sent over the network to a naming service such as the Domain Name Service (DNS) in order to obtain instructions for how to establish a connection with the correct home server. Once the connection with the server is established, the client can then retrieve the desired document by passing the local information text string over the network directly to the home server. The server then retrieves the document from its local disk or memory storage and transmits the document over the network to the client. The network connection between the home server and the client is then terminated.

Computer and network industry analysts and experts are presently quite concerned that traffic on the Internet is becoming so heavy that the very nature of the way in which it is possible to use the Internet may change. In particular, many individuals now believe that the Internet is intolerably slow and is no longer a reliable entity for the exchange of information in a timely fashion.

The present bottlenecks are no doubt the result of exponential increases in the number of users as well as in the number of complex documents such as multimedia files being sent. It might appear that the answer is simply to add more bandwidth to the physical connections between servers and clients. This will come, however, only at the expense of installing high bandwidth interconnection hardware, such as coaxial or fiber optic cable and associated modems and the like, into homes and neighborhoods around the world.

Furthermore, added bandwidth by itself perhaps would not guarantee that performance would improve. In particular, large multimedia files such as for video entertainment would still potentially displace higher priority types of data, such as corporate E-mails. Unfortunately, bandwidth allocation schemes are difficult to implement, short of modifying existing network communication protocols. The communication technology used on the Internet, called TCP/IP, is a simple, elegant protocol that allows people running many different types of computers such as Apple Macintoshes, IBM-compatible PCs, and UNIX workstations to share data. While there are ambitious proposals to extend the TCP/IP protocol so that the address can include information about packet content, these proposals are technologically complex and would require coordination between operators of many thousands of computer networks. To expect that modifications will be made to existing TCP/IP protocols is thus perhaps unrealistic.

An approach taken by some has been to recognize that the rapidly growing use of the Internet will continue to outstrip server capacity as well as the bandwidth capacity of the communication media. These schemes begin with the premise that the basic client-server model (where clients connect directly to home servers) is wasteful of resources, especially for information which needs to be distributed widely from a single home server to many clients. There are indeed, many examples of where Internet servers have simply failed because of their inability to cope with the unexpected demand placed upon them.

To alleviate the demand on home servers, large central document caches may be used. Caches are an attempt to reduce the waste of repeated requests for the same document from many clients to a particular home server. By intercepting parallel requests, a cache can be used to serve copies of the same document to multiple client locations.

To illustrate some of the difficulties presented by conventional caching techniques, consider the following example. Suppose a news service organization has a home server that is based domestically within the United States. The volume of document requests received at the home server (both from within the United States and from other countries) may increase to a point in which the news organization decides to lessen the load at the domestic site by creating an overseas site to service overseas clients. Accordingly, the news service organization adds an overseas site that "mirrors" the domestic site, i.e., that stores a copy of the documents at the domestic site for overseas access. When an overseas client without knowledge of the mirroring overseas site sends a document request to the domestic site, the domestic site responds by sending a message to the overseas site instructing the overseas site to provide the requested document. The overseas site responds to this message by providing its mirror copy of the document to the overseas client.

In this mirroring approach, the domestic site is no longer burdened with the task of providing the document to the overseas client. However, the initial document request message must still reach the domestic site, and the domestic site must subsequently provide a message to the overseas site instructing the overseas site to provide the document to the client. Accordingly, in this approach, messages travel in a triangular manner from the overseas client to the domestic site, from the domestic site to the overseas site, and from the overseas site back to the overseas client. As such, response times may be slow due to the amount of network (number of hops and distances) the messages must pass through. In particular, delays such as those caused by bottlenecks at the cross-oceanic network connections may result in excessively long response times reducing the benefit of the mirroring overseas site to the overseas clients.

Some home servers provide services that are not primarily document access services. For example, some servers receive information from a client, provide processing services, and then send a processing result back to the client. An alternative to this traditional client/server approach is for the server to send code to the client, and for the client to execute the code. This approach offloads the processing work onto the client. Additionally, once the code reaches the client, the client may be able to execute the code repetitively without the need for sending additional messages back and forth between the client and server in order to reduce network traffic. An example of this approach is the use of Java applets.

Another approach involves offloading servicing work from a home server to an intermediate node interconnected between the home server and the client. Here, the home server sends a document and code to the intermediate node. At the intermediate node, the code executes and modifies the document. The modified document is then sent to the client in a more customized form. Accordingly, the work of customizing the document is performed by the intermediate node rather than the home server. An example of this approach is the use of Active Networks. One Active Network architecture is discussed in an article entitled "Towards an Active Network Architecture", by Tennenhouse et al., in a paper presented at a keynote session of Multimedia Computing and Networking, San Jose, Calif., January 1996, the teachings of which are incorporated by reference herein in their entirety. Another similar approach which is geared towards multimedia is explained in U.S. Pat. No. 5,592,626 (Papadimitriou et al.).

SUMMARY OF THE INVENTION

Embodiments of the present invention are directed to techniques for fulfilling service requests within a system of computers that communicate as nodes within a network. The techniques involve using a mobile agent to instruct an intermediate node such that it operates as a front end server. In particular, a primary server node distributes the mobile agent to dedicated intermediate nodes within the network. When a dedicated intermediate node located between a client node to the primary server node receives and uses the mobile agent, the dedicated node becomes capable of intercepting service requests from the client node to the primary server node. In one implementation, the dedicated node operates as a secondary server node to directly service requests sent from client nodes to the primary server node. In another implementation, the dedicated node redirects the work of servicing the requests to a secondary server node. For a document request, the secondary server node (a cache server) returns a cached document to the requesting client node. The service requests are thus responded to before they ever reach the primary server node.

By distributing the work of servicing requests to one or more secondary server nodes within the network, the work of servicing requests that are intercepted on their way to the primary server node is offloaded from the primary server node. The secondary server nodes are preferably closer to the client nodes (by number of hops and distance) such that response time is faster, and less network traffic is created.

Preferably, the offloading techniques are automatic and transparent. In particular, the secondary server nodes preferably are able to service requests without departing from standard network protocols. In one approach, the secondary server nodes act as communication protocol proxies for the home server (e.g., the secondary server nodes are a proxy servers). Accordingly, as part of fulfilling service requests at the intermediate locations, the client nodes are sent appropriate messages, depending upon the communication protocol in use, to "spoof" the client nodes into believing that the services were actually provided by the primary server node.

In one embodiment, the redirection technique involves redirecting a service request from an intermediate node to a secondary server node to fulfill the service request. In particular, the technique involves sending, in response to an initial service request that requests a service provided by a primary server node, a mobile agent from the primary server node to an intermediate node. The mobile agent indicates to the intermediate node that a secondary server node is capable of providing the service. Additionally, the technique involves intercepting, at the intermediate node, a subsequent service request sent from a client node to the primary server node, the subsequent service request requesting the service, and sending an instruction from the intermediate node to the secondary server node. The instruction instructs the secondary server node to provide the service. The technique further involves providing, in response to the instruction, the service from the secondary server node to the client node.

With the above-described redirection technique, the servicing of the subsequent service request is redirected from the primary server node to the secondary server node. Preferably, the service request is intercepted before it reaches the primary server node, and handled by the secondary server node without intervention from the primary server node. This enables a reduction in network traffic to the primary server node, and allows the work of servicing the subsequent service request to be unloaded from the primary server node onto the secondary server node.

Preferably, the mobile agent includes a set of rules for responding to service requests and a list of server nodes that are capable of providing the service. Accordingly, when a subsequent service request is intercepted at the intermediate node, the intermediate node can select one of the server nodes on the list as the secondary server node to service the request. Selection of the secondary server node by the intermediate node is based on the set of rules of the mobile agent.

Even though the service is provided by a secondary server node rather than the primary server node, the service response preferably includes a source identifier indicating the primary server node as the source of the service response. Accordingly, the client node can be spoofed into believing that the primary server node serviced the request, and the unloading of work from the primary server node to the secondary server node is transparent.

In another embodiment, the dedicated nodes receiving the mobile agent does not redirect requests. Rather, the dedicated node uses the mobile agent to service requests directly. The technique involves receiving, at a secondary server node, a mobile agent from a primary server node. The technique further involves executing, in response to service requests from client nodes, code of the mobile agent at the secondary server node to provide service responses to the client nodes.

The secondary server node provides a first service response having a first content for a first client node and a second service response having a second content for a second client node, where the first and second contents are different from each other. Traditionally, only the primary server node was capable of providing such responses since execution of the code to generate the responses would occur only at the primary server node. Using this technique, code for servicing requests is transferred to a secondary server node for execution. Accordingly, the work of servicing service requests can be offloaded from the primary server node, and brought closer to the client nodes.

Although conventional techniques may allow a client node to execute code that traditionally executed on a server node (e.g., Java applets), such techniques generally do not address the issue tying activity of multiple clients together, such as in the context of a computerized game played by multiple clients. A secondary server node has this capability since it can receive messages from each client node and provide a cohesive environment to each client node. In particular, when the mobile agent is a computerized game, executing the code of the mobile agent on a secondary server node preferably involves providing, to a first client node, a first image as the first content of the first service response, and providing, to a second client node, a second image as the second content of the second service response. The first and second images may be different views of a computer simulated environment.

Alternatively, the mobile agent may handle the selection of advertisements for client viewing. In this situation, executing the code of the mobile agent may involve providing, to the first client node, a first advertisement as the first content of the first service response based on client node data, and providing, to the second client node, a second advertisement as the second content of the second service response based on the client node data. The first and second advertisements may be different from each other, and selected to have maximum impact at the client nodes. To this end, the client node data may include statical information regarding past service requests and client node preferences that develop over time, as seen by the secondary server node. Accordingly, content providers can customize responses to the clients nodes such that the selected responses to each client node include advertisements of particular interest to the clients nodes.

BRIEF DESCRIPTION OF THE DRAWINGS

For a more complete understanding of the advantages provided by the invention, reference should be had to the following detailed description together with the accompanying drawings, in which.

DETAILED DESCRIPTION OF PREFERRED EMBODIMENTS

Figure 1:
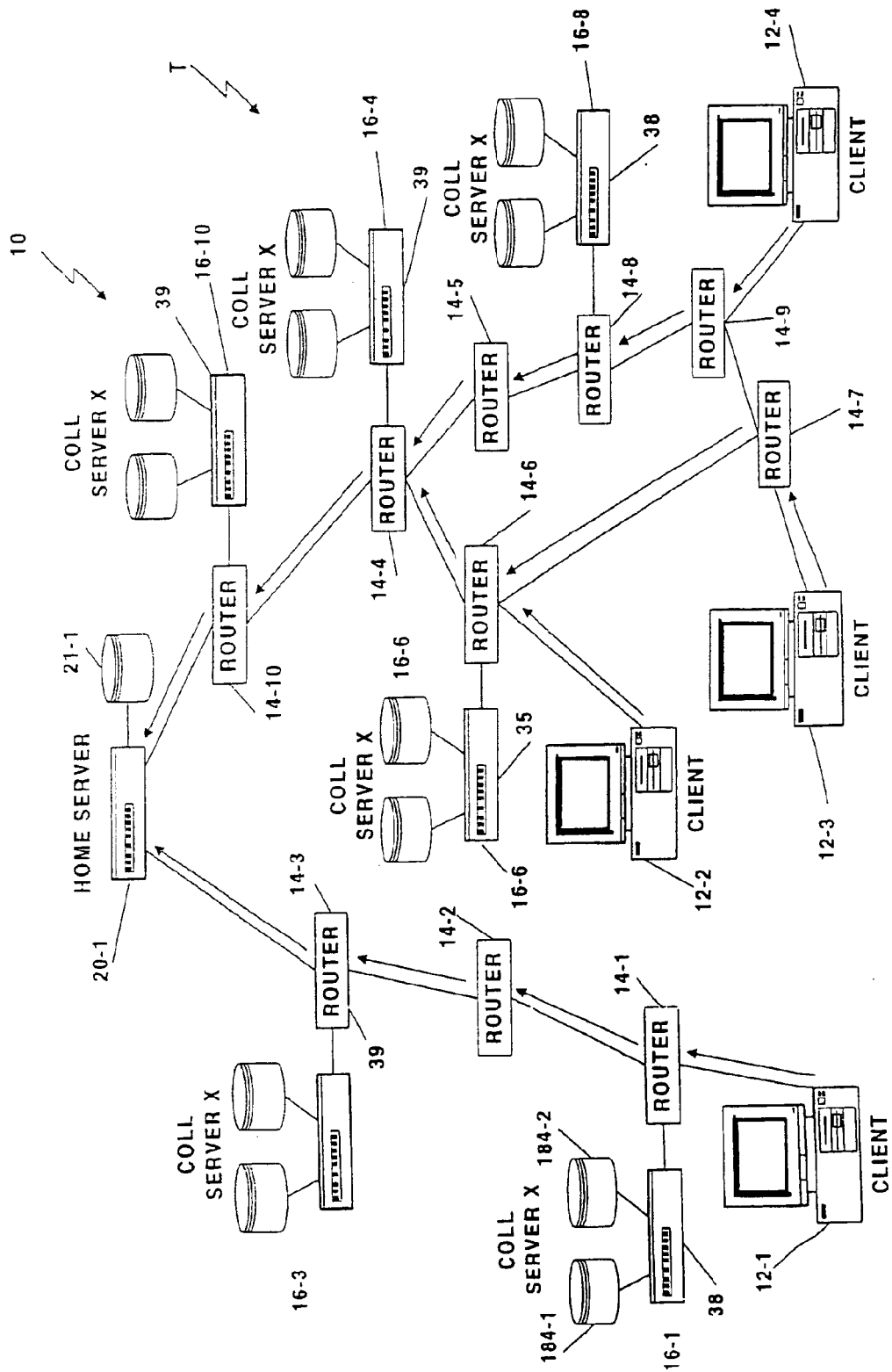
FIG. 1 depicts a typical computer network showing a request path for a single document and the location of cache servers along the path according to the invention.

Turning attention now to FIG. 1, a computer network 10 such as the Internet, extranet, private intranet, virtual private network, local area network, or any other type of computer network consists of a number of network entities (or nodes) including client computers 12-1, 12-2, 12-3, . . . , 12-4 (collectively, clients 12), routers 14-1, 14-2, . . . , 14-10, cache servers 16-1, 16-3, 16-4, 16-6, 16-8, and 16-10, and home server 20. The network may make use of any and various types of physical layer signal transmission media such as public and private telephone wires, microwave links, cellular and wireless, satellite links, and other types of data transmission.

In the illustrated network, certain routers 14 have associated with them cache servers 16, whereas other routers do not have associated cache servers. The cache servers 16 include various types of storage for documents in the form of a cache storage 18-1 which may include disk storage 18-1-1 and/or memory storage 18-1-2.

The clients 12 and home server 20 operate as in the prior art to permit distribution of a wide variety of services, e.g., providing access to "documents" stored at the home server. Such documents may actually contain text, graphics, pictures, audio, video, computer programs and any number of types of information that can be stored in a computer file or parts of a computer file. Furthermore, certain documents may be produced at the time that access is requested to them, by executing a program.

Preferably, the home server 20 distributes a particular type of document referred to as a mobile agent. As will be explained in detail in a later section, the mobile agent includes code and information to enable nodes in the network to service requests either directly or through redirection. As such, the work of servicing service requests is offloaded from the home server (a primary server node) to other nodes (secondary server nodes) within the network.

It will be assumed in the following discussion that the network 10 is the Internet, that the service requested is access to information encoded in the form of the Hyper Text Transfer Protocol (HTTP) documents, and that document request messages are sent in the form of Uniform Resource Locators (URLs) using the TCP/IP layered protocol. This is with the understanding that other types of wired, switched, and wireless networks, and other types of protocols such as FTP, Gopher, SMTP, NNTP, etc. may make advantageous use of the invention. In addition, although the invention is discussed in the context of a client-server type of communication model, it should be understood that the principals of the invention are equally applicable to peer-to-peer networks.

A request message for a particular document, for example, originates at one of the client computers, such as client 12-1. The message is a service request by the client 12 for the home server 20 to send a copy of the document that is presently stored at the home server 20 location such as on a disk. The message is passed through one or more routers 14, such as routers 14-1, 14-2, 14-3, in the direction of the illustrated arrows, on its way to the home server 20.

In networks such as the Internet, service request messages may pass through as many as fifteen or more nodes or "hops" through routers 14 before reaching their intended destination. Requests for the same document (document requests) from other clients, such as clients 12-2, 12-3, or 12-4 also pass through different routers 14 on their way to the home server 20 at the same time.

It should also be understood that although the routers 14 and cache servers 16 are shown as separate elements in FIG. 1, that their functionality may be combined into a single element.

A model is useful for understanding the nature of how requests from multiple clients for one particular document travel across a path the computer network 10. The model is that structure, T, which is induced by the effect of routing algorithm on the document request messages as they travel through the network to the home server 20. As shown in FIG. 1, the home server 20 can thus be thought of as being at the root node of the structure, T, with document requests originating at the leaf node levels farthest away from the root, namely at clients 12-1, 12-2, . . . , 12-4. The structure T also includes many intermediate nodes which are located the routers 14.

While the structure T of the set of paths that client requests follow toward a given home server 20 is accurately and generally described as a data directed, acyclic graph, the present exposition does not benefit from the added complexity. In particular, when a single particular document is considered as being located at only one home server, the structure can be referred to as a tree with a single root. With that understanding we use the term tree to describe the structure T herein, with the understanding that a graph model may also be used. With this model in mind, the entire Internet can be thought of as a forest of trees or graphs, each rooted at a different home server 20 which is responsible for providing an authoritative permanent copy of some set of documents.

Copies of documents are located in the network at cache servers 16. In one embodiment of the invention, the placement of cache copies, and hence the diffusion of load, is constrained to nodes in the tree structure, T. This avoids the need for clients to lookup the locations of cache copies, either by directly contacting the home server 20, or a naming service such as a Domain Name Service (DNS), or by probing the network in search of appropriate cache copies.

One embodiment also assumes that cache servers 16 lie on the path along the tree that document request messages would naturally take from the client 12 to the home server 20, with the cache servers 16 cooperating to off-load excess load at the home server 20, or to diffuse other potential performance bottlenecks such as communication links themselves. In effect, the routers 14 having associated cache servers 16 inspect document request message packets as they fly-by and intercept any request for which it may be possible to fulfill by providing a cached document instead.

By way of example, document request messages travel up the tree T, from a client at which it originated, such as client 12-3, towards the home server 20 (see FIG. 1). Certain routers encountered by the document request message along the way, such as router 14-7, do not have local cache servers 16, and thus simply pass the document request message up to the next router in the tree, such as router 14-6.

However, certain other routers, such as router 14-6, do have a local cache server 16-6, in which case the document request message is examined to determine if it is seeking a document located in the local cache store 18. If a cache copy is encountered at cache server 16-6, then that copy is returned to the client 12, and the request message is not permitted to continue on its way to the home server 20. If however, a cache copy is not encountered at the particular cache server 16-6, the request message continues to the next router 14-4 on the path to the home server 20.

When a request message packet enters a router 14, the router first passes the request message to a portion of its software referred to herein as the filter code. The filter code in the router 14 is updated as necessary by the local cache server 16. The filter code depends on the types of packets, the cache contents, the load at the local cache server 16, or the load on the attached communication links. The filter causes the interception of the packet (for an attempted service by the local cache server 16) or passes the packet back to the router 14 to determine the next hop the packet should take on its way to the home server 20. In one embodiment, the filter code is distributed from the home server 20 within a mobile agent. Mobile agents are discussed in a later section.

Ideally, the implementation of the cache servers 16 is such that no changes are required to the normal operating mode of either clients 12 or servers 20. Another goal is to have a design that can be gradually deployed into the existing infrastructure of the network 10. This also requires that any new mechanisms preferably be compatible with existing communication protocols.

Further details of layered protocol proxying, load management, document request routing, and neighborhood discovery can be found in a related application entitled "A Method and System of Distributed Caching, Prefetching and Replication," published as WO98/53410 which is hereby incorporated by reference.

Some embodiments of the invention are directed to techniques for fulfilling service requests (e.g., document requests) using a mobile agent. The technique involves the distribution of the mobile agent to a dedicated intermediate node located within a network between a primary server node and a client node. The mobile agent instructs the intermediate node to operate as a front end server by executing code of the mobile agent such that the intermediate node provides at least a portion of the requested service. In particular, when the client node sends a service request to the primary server node, the intermediate node intercepts the request, and uses the mobile agent to either service the request itself, or redirect the work of servicing the request to a secondary server node. Accordingly, the work of servicing the request is offloaded from the primary server node. Furthermore, the actual node servicing the request is preferably closer to the client node than the primary server node such that there are less delays in sending messages (e.g., requests and responses) through the network, and less network messages passed to and from the primary server node.

Figure 2:
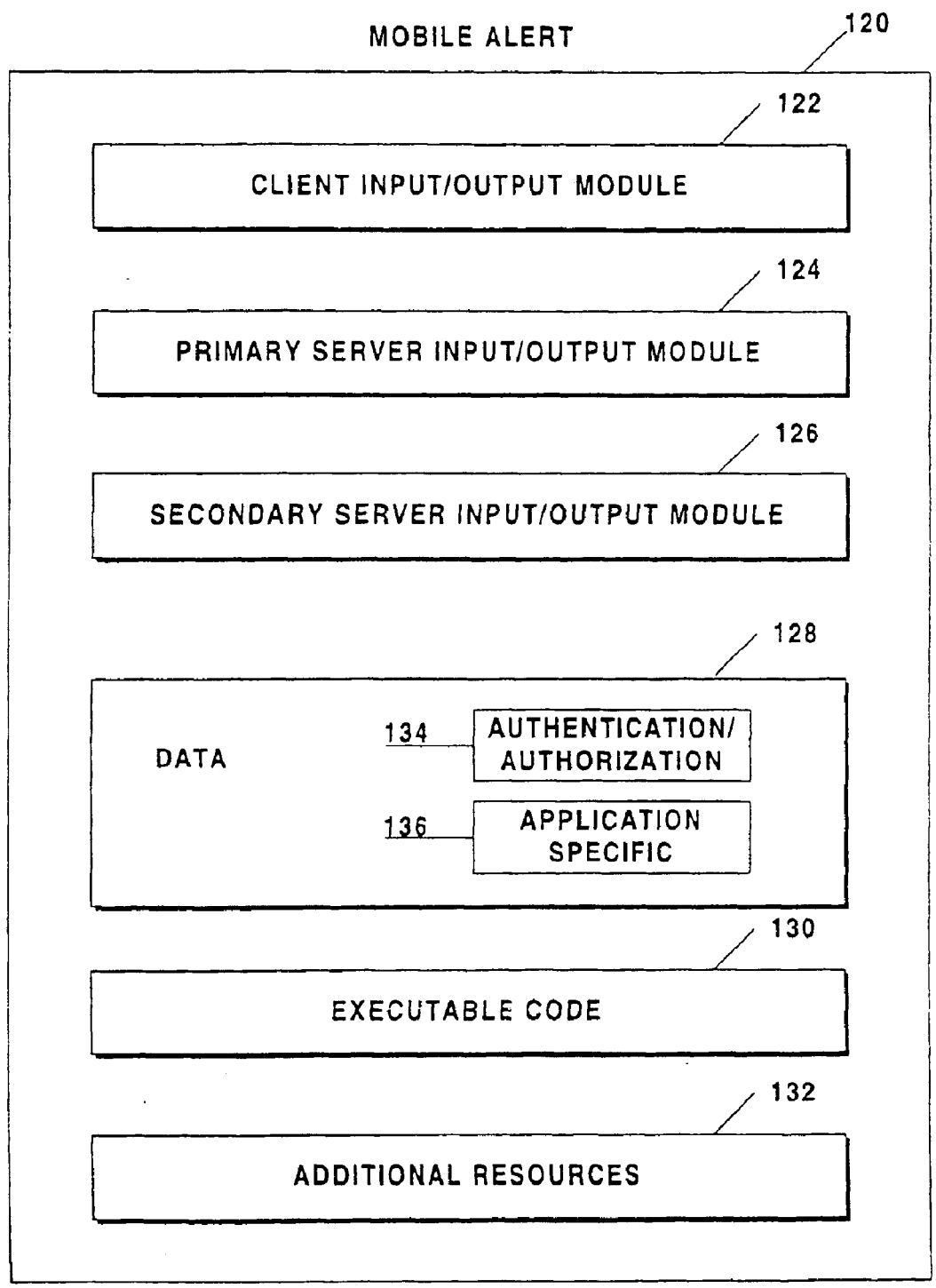
FIG. 2 is a block diagram of a mobile agent suitable for use by embodiments of the invention.

FIG. 2 shows a mobile agent 120 that is suitable for use by a dedicated intermediate node within a network. In general, the mobile agent 120 includes a client input/output module 122, a primary server input/output module 124, a secondary server input/output module 126, mobile agent data 128, executable 130, and additional resources 132. The client input/output module 122 handles communication with client nodes such as the interception of service requests from client nodes to the primary server node. The primary server input/output module 124 handles communication with the primary server node such as receiving instruction messages from the primary server node. The secondary server input/ output module 126 handles communication with secondary server nodes such as the output of instructions to one or more secondary server nodes. The data 128 includes information such as authentication or authorization tokens 134 and application specific data structures 136. The data 128 may also include information such as the names of, loads on, and distances to secondary servers.

The executable code 130 controls the operation of the dedicated node (e.g., operating according to a set of rules). The additional resources 132 includes miscellaneous data and code for fulfilling the service requests (e.g., a list of nodes in the network that are capable of operating as secondary server nodes).

In certain situations, the mobile agent may perform additional functions. For example, the executable code 130 may include rules for selecting a secondary server.

The executable code 130 may also include multiple execution threads, each of which carries out the rules for one service request or a sequence of requests.

In one specific application where the mobile agent implements a game, the executable code 130 includes threads for handling activity from each player, and the data 128 includes the names of player sub-groups and game state for each sub-group.

In other situations, one or more of these mobile agent components may be eliminated from the mobile agent 120. For example, when the dedicated intermediate node is to operate as a secondary server node (rather than redirect the service work to a secondary server node) the secondary server input module 126 is unnecessary.

Figure 3:
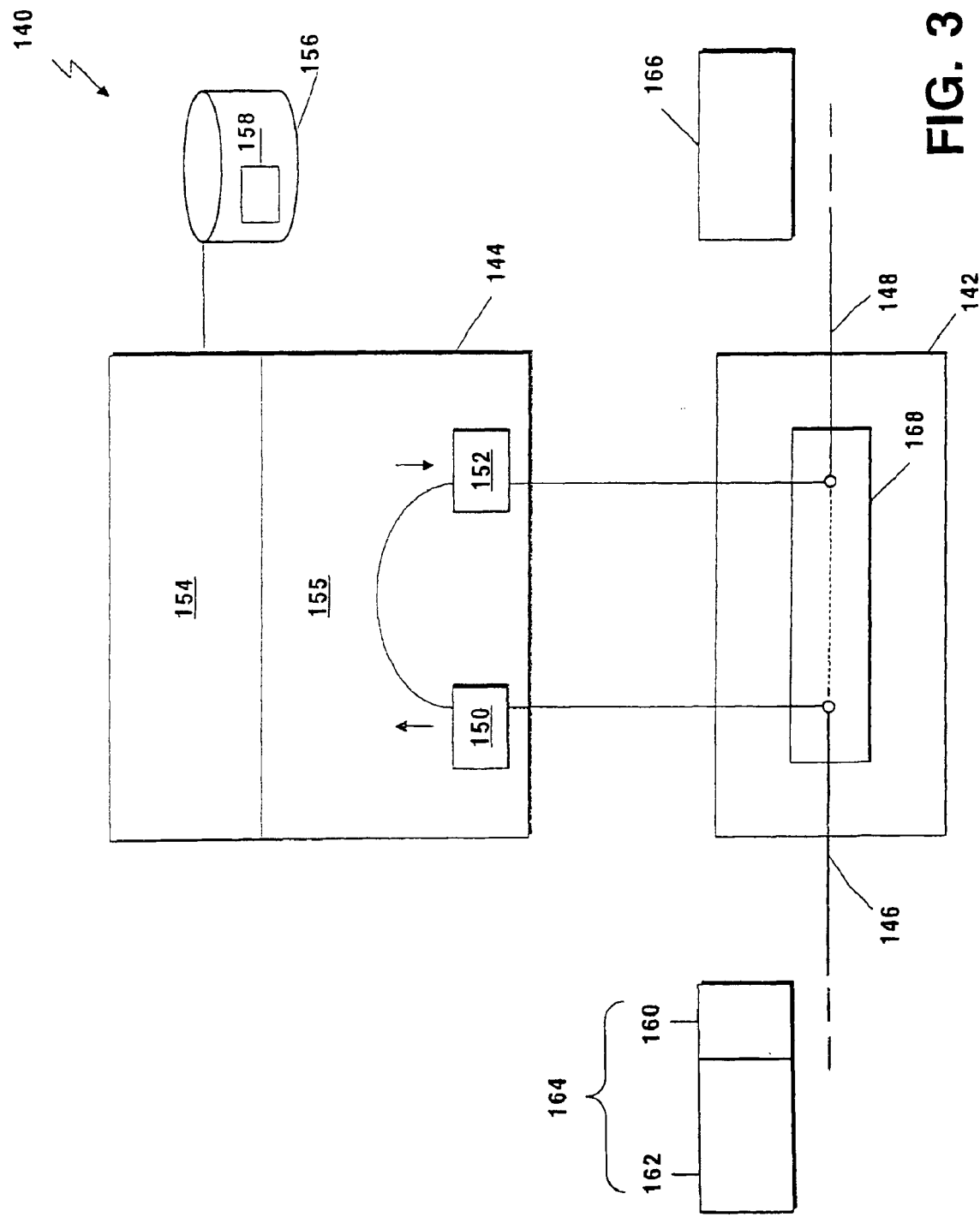
FIG. 3 is a block diagram of a computerized processing node that uses the mobile agent of FIG. 2.

FIG. 3 is a block diagram of a dedicated intermediate node 140 suitable for using the mobile agent 120 of FIG. 2. The dedicated intermediate node 140 includes a linking device 142 and a computerized processing device 144. The linking device enables the dedicated intermediate node to be inserted within a network between two other nodes. In particular, the linking device 142 connects to one adjacent node through a first port 146, and to another adjacent node through a second port 148.

The computerized processing device 144 includes a processor (or controller) 154, memory 156 (e.g., semiconductor memory and disk memory), and an interface 153 having two access ports 150,152 that connect the computerized processing device 144 to the link device 142. The computerized processing device 144 (e.g., a general purpose computer with port connections to the linking device) executes a program 158 stored in the memory 156 which enables the device 144 to receive and use mobile agents such as that shown in FIG. 2.

The linking device 168 includes a switch 168 that provides a shunt between the first and second ports 146,148 of the linking device 142 when the computerized processing device 144 is not operating. For example, if the computerized processing device is turned off, or fails during operation, the switch 168 connects the first and second ports 146,148 such that traffic can continue to travel from one port to the other. In one implementation, the switch 168 is a set of electro-mechanical relays that switch to a shunt position in the absence of communication with the computerized processing device 144.

During operation, the dedicated intermediate node 140 receives a mobile agent 160 from a primary server node through one of the ports 146,148 of the linking device 142. The computerized processing device 144 stores the mobile agent 160 in the memory 156. As will be explained below, the mobile agent may arrive within a service response 164 having (in addition to the mobile agent 160) a response 162 for a client node. The computerized processing device 144 can copy the mobile agent 160 from the service response 164, and forward the entire server response 164 to the next node in the network. Alternatively, the computerized processing device 144 can extract the mobile agent 160 from the service response 164 and send a modified service response 166 including the response 162 but not including the mobile agent 160 to the next node in the network. In either case, the dedicated intermediate node 140 receives the mobile agent 160, and the client node eventually receives the response 162.

With the mobile agent 160 now in place at the dedicated intermediate node 140, the mobile agent 160 instructs the node 140 to inspect network traffic and operate either as a secondary server node or a redirecting intermediate node based on the executable code 130 (see FIG. 2) of the mobile agent. This determination of how the dedicated intermediate node 140 is to operate is application specific. For example, if the goal is to intercept document requests sent from client nodes to a primary server node such that a secondary server node services the document requests rather than the primary server node, the executable code 130 directs the dedicated intermediate node to filter out document requests from the client nodes to the primary server node, and to send messages to the secondary server node instructing the secondary server node to provide the requesting client node with access to the requested document. This sequence of operations will be further explained by way of example and with reference to FIG. 4.

Figure 4:
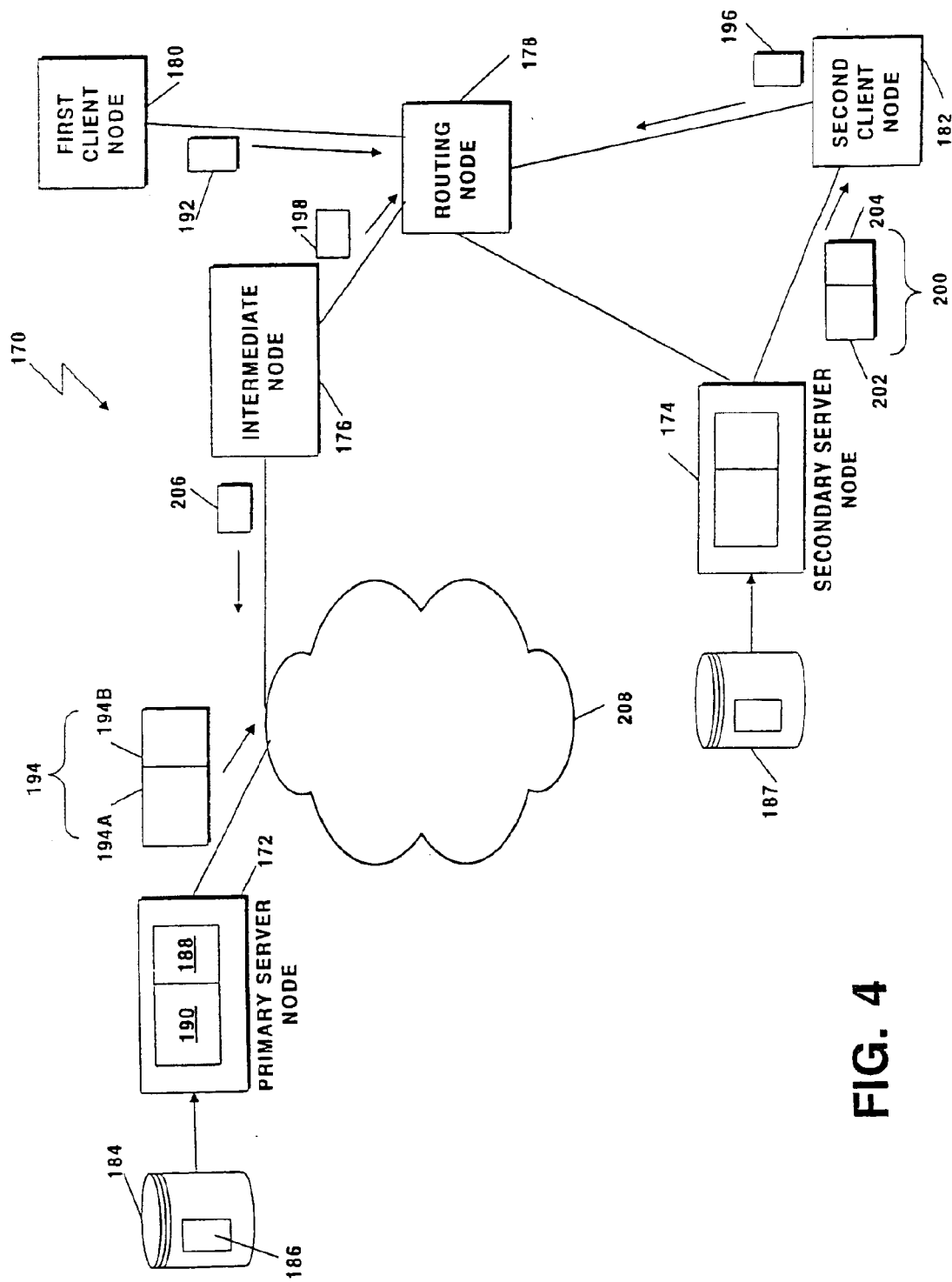
FIG. 4 is a block diagram of a system of computers that communicate as nodes within a network, the system including the computerized processing node of FIG. 3 to fulfill a service request using redirection.

FIG. 4 shows a network 170 including a node that operates to (i) intercept a document request sent by a client node to a primary server node, and (ii) offload the work of servicing the request to a secondary server node that mirrors the primary server node. In particular, the network 170 includes a primary server node 172, a large network portion 208, a secondary server node 174, an intermediate node 176, a routing node 178, a first client node 180, and a second client node 182. The large network portion 208 represents additional nodes (e.g., routers) that messages must travel through in order to for the primary server node 172 to communicate with the other nodes.

Each of the primary server node 172 and the secondary server node 174 includes a processor 190, memory 186 and a network interface 188. The other nodes of the network 170 can include similar components. The memory 184 of the primary server node 172 stores a document 186. Similarly, the secondary server node 174 stores a copy 187 of the document 186.

Suppose that the primary server node 172 is a news organization located somewhere in Country A. Additionally, suppose the remaining nodes are located overseas in a different country, Country B, and further suppose that the network portion 208 includes cross-oceanic network connections that connect the primary server node 172 to the nodes in Country B. Furthermore, suppose that the intermediate node 176 is a processing node as shown in FIG. 3.

If the first client node 180 wants access to the document 184 at the primary server node 180, the first client node sends a document request 192 to the primary server node 180 through the routing node 178, the intermediate node 176 and the large network portion 208. Then, the primary server node 172 sends a response 194 to the first client node 180 through the intermediate node 176, the routing node 178 and the large network portion 208. The response 194 includes a mobile agent 194A and response 194B. The mobile agent directs the intermediate node 176, on receiving a subsequent request from a second client node, to send a message to the secondary server node 174 instructing the secondary server node 174 to provide the second client node 180 with the requested service. The intermediate node forwards the response 194B to the first client. Accordingly, the document request 192 is satisfied.

When the intermediate node 176 receives the mobile agent, the intermediate node 176 extracts or copies the mobile agent 194A from the response 194 and becomes equipped to handle subsequent service requests using redirection. That is, suppose that the second client node 182 then sends a document request 196 to the primary server node 172 requesting access to the document 186. When the document request 196 reaches the intermediate node 176, the intermediate node sends a message 198 to the secondary server node 174 instructing the secondary server node 174 to provide a response 200 to the second client node 182. In particular, the intermediate node 176 chooses the secondary server node 174 from a list of secondary server nodes capable of servicing the request. The response 200 includes the copy 202 of the document stored at the secondary server node 174 and a source identifier 204 indicating the primary server node 172 as the source of the response 200. Accordingly, the second client node 182 is spoofed into believing that the response 200 came from the primary server node 172. However, in connection with the subsequent service request 196 from the second client node 182, no messages needed to pass through the large network portion 208 to or from the primary server node 172. Accordingly, less traffic was created, and less delays were caused by the network.

Figure 5:
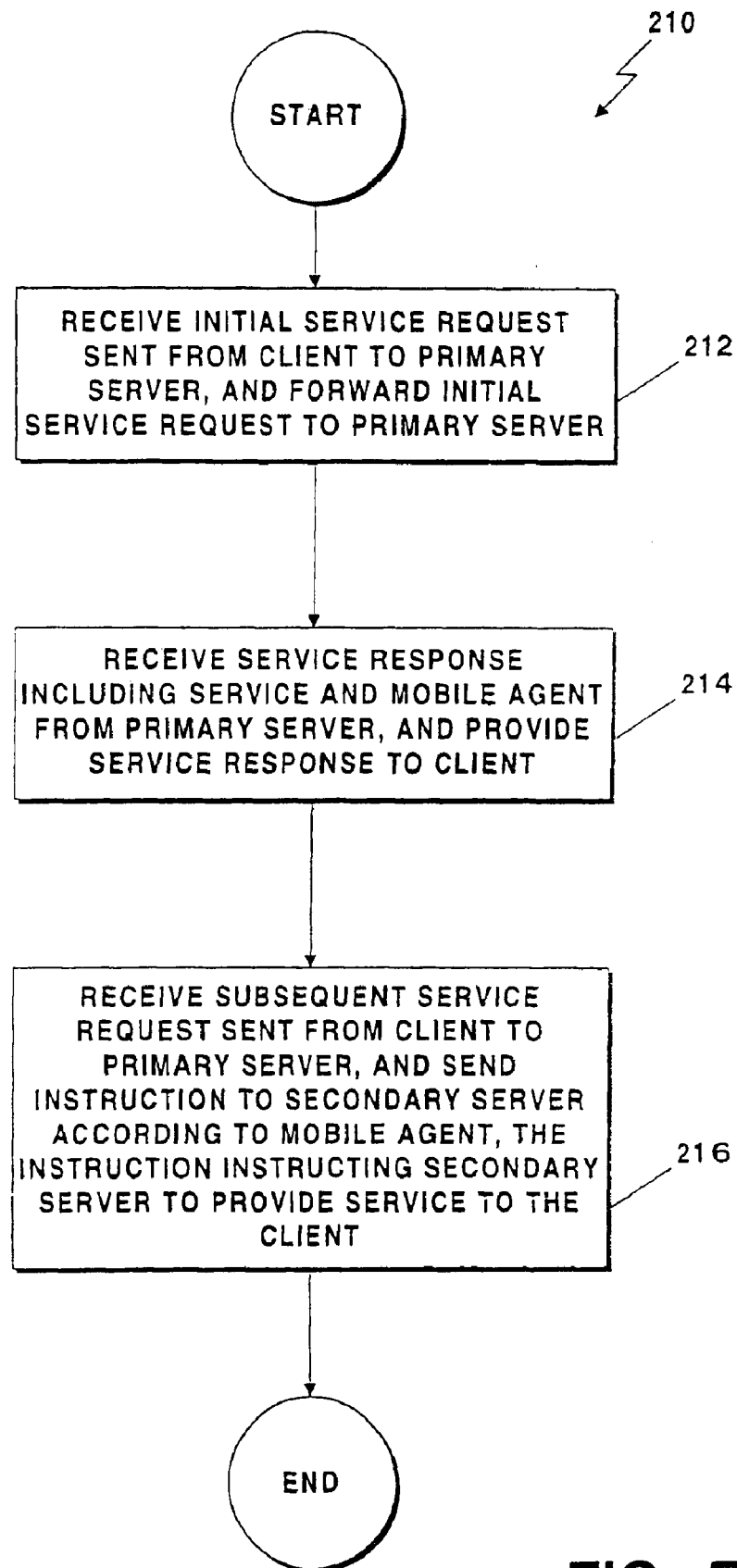
FIG. 5 is a flow chart of the steps taken by the computerized processing node of FIG. 3 to fulfill a service request using redirection.

FIG. 5 shows a procedure 210 performed by the intermediate node 176 to service the initial document request 192 and the subsequent document request 196. In step 212, the intermediate node 176 receives the initial document request 192 from the first client node 180 and forwards the request 192 on to the primary server node 172. At this time, the intermediate node 198 simply operates as a bridge to convey messages (e.g., service requests) between the routing node 178 and the large network portion 208.

In step 214, the intermediate node 176 receives the response 194 from the primary server node 172 and provides the response to the first client node 180. In particular, the intermediate node 176 extracts or copies the mobile agent 194A from the response 194, and sends the message 198 to the secondary server node 174 with instructions to service the request. At this time, the intermediate node 176 has the mobile agent 194A and thus is capable of operating as a front end server.

In step 216, the intermediate node 176 intercepts the subsequent document request 196 from the second client node 182, and provides partially servicing of the request by redirecting the request to the secondary server node 174 without intervention by the primary server node 172. In particular, mobile agent 194A controls the intermediate node 176 such that the intermediate node sends a message 198 instructing the secondary server node 174 to provide service to the second client node 182. Preferably, the mobile agent includes a set of rules (e.g., executable code 130 in FIG. 2) and a list of secondary server nodes (e.g., additional resources 132 in FIG. 2) identifying secondary server nodes capable of servicing the document request. The secondary server node 174 is chosen because of its proximity to the second client node 182 or because of any other suitable optimization criteria. Accordingly, the copy 187 of the document at the secondary server node 174 is provided to the second client node 182 without the need to send messages to or from the primary server node 172 through the large network portion 208.

In another preferred embodiment, the intermediate node is a dedicated node that operates as a secondary server node. In this situation, the intermediate node fully services requests from the client node without the need to send messages to another secondary server node. Further details of this embodiment will now be provided with reference to FIG. 6.

Figure 6:
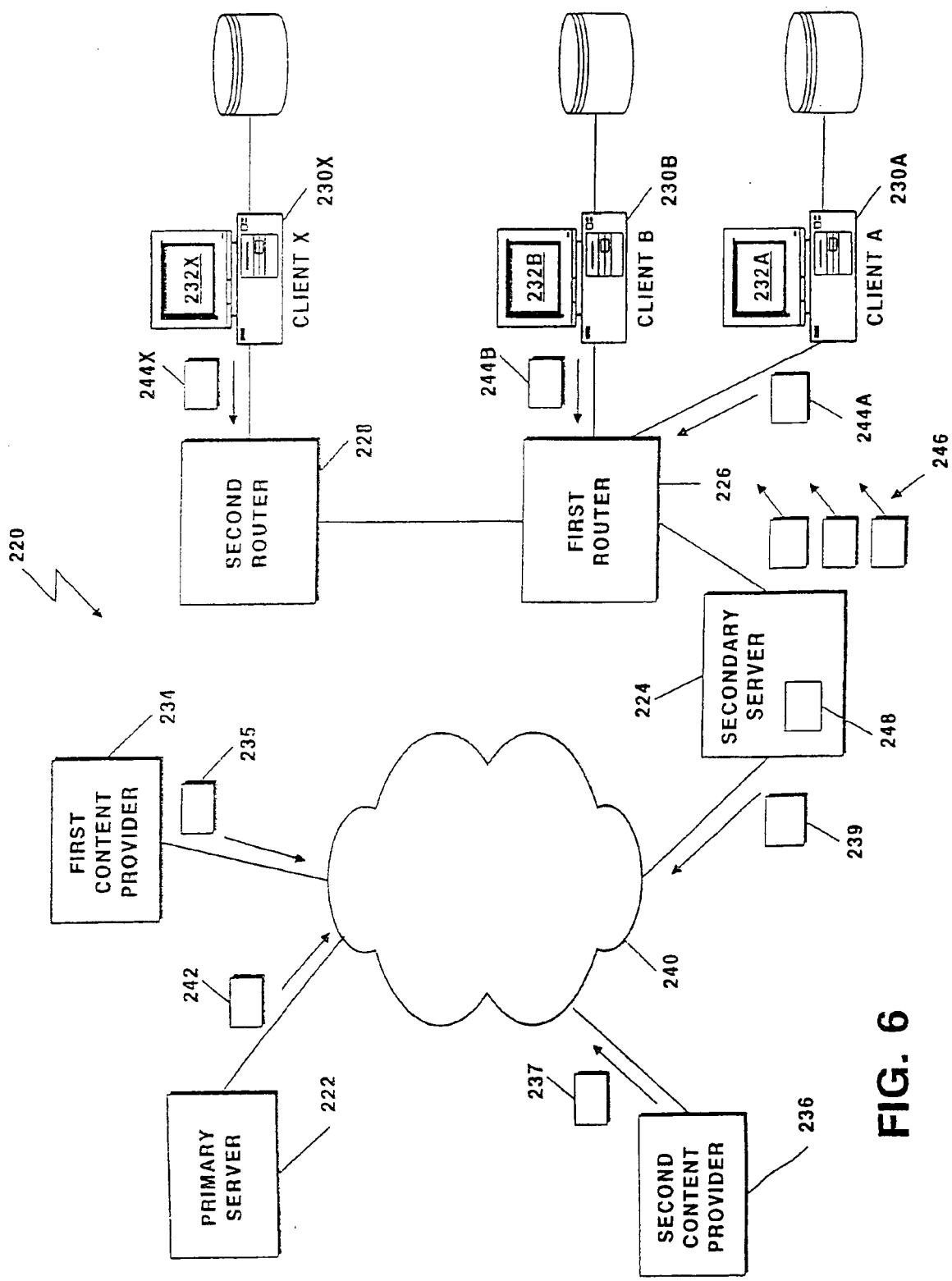
FIG. 6 is a block diagram of a system of computers that communicate as nodes within a network, the system including the computerized processing node of FIG. 3 to fulfill a service request directly.

FIG. 6 shows a network 220 that is similar to that of FIG. 4. The network 220 includes a primary server node 222, a secondary server 224, a first router 226, a second router 228, multiple client nodes 230A, 230B through 230X (collectively 230), and a large network portion 240 that is similar to the large network portion 208 in FIG. 4. Each client node 230 includes a respective display 232A, 232B through 232X (collectively 232).

The primary server node 222 sends a mobile agent 242 to the secondary server node 224. This activity does not need to occur in response to a service request, but rather is preferably distributed proactively during idle periods. The secondary server node 224 is then equipped to directly service requests from the client nodes 230. For example, the first client node 230A sends a service request 244A to the primary server node 242. When it reaches the secondary server node 224, the secondary server node 224 intercepts the service request 244A and provides a response 246 to the first client node 230A according to a set of rules (e.g., executable code) of the mobile agent 242.

Similarly, the secondary server node 224 is capable of servicing other clients such as clients 230B through 230X. Due to the location of the secondary server node 224 to the clients 230, certain types of services lend themselves well for servicing by the secondary server node 224. For example, the executable code of the mobile agent may be a game that is played by each of the client nodes 230. The responses 246 to the respective clients 230 may include client specific data such as a unique image or view of an environment shared by all of the client nodes 230 (e.g., a flight simulator game in which each client occupies a particular volume in the same air space). Accordingly, each response 246 may include a customized video image for display on the displays 232 of the client nodes 230. As such, each image to client nodes 230 may be different.

As another example, the network 220 further includes content providers 234,236. Each content provider provides one or more advertisements suitable for display on the client nodes 230. The secondary server node 224 stores client node data 248 indicating particular preferences and interests specific to each client node 230. Preferably, the data is accumulated over time. When the secondary server node 224 provides documents (responses 246) to the clients 230, the documents include placeholders for one or more advertisements. The secondary server node 224 selects and fills the placeholders with the advertisements from the content providers 234,236 based on the mobile agent 242. In particular, the secondary server node 224 attempts to match advertisements of interest with each client 230.

As yet another example, the secondary server node 224 operates as a front end for tying together multiple services from one or more service providers. For example, a travel service may require access to airline services as well as rental car services. The use of a mobile agent by the secondary server node 224 enables the secondary server node to provide full service capabilities to a travel service by operating as a secondary server node for each service provider. This approach is functionality driven rather than performance driven. In particular, various functions (car rental, airline reservations, etc.) are brought together in a central server location.

Figure 7:
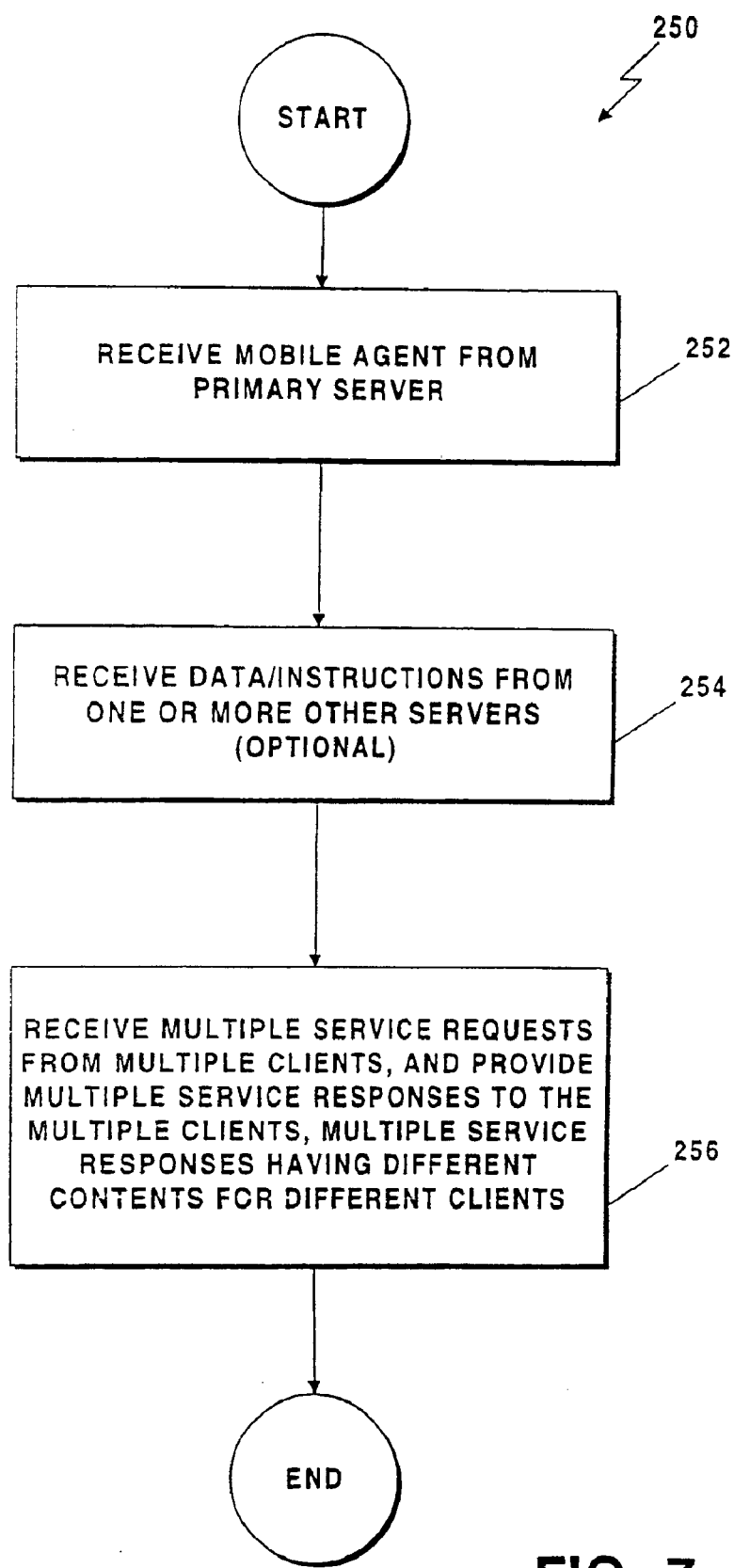
FIG. 7 is a flow chart of the steps taken by the computerized processing node of FIG. 3 to fulfill a service request directly.

FIG. 7 shows a procedure 250 performed by the secondary server node 246 to service requests from the client nodes 230. In step 252, the secondary server node 224 receives the mobile agent 242 from the primary server node 222 through the large network portion 240. As a result, the secondary server node 224 becomes capable of servicing requests directly.

In step 254, the secondary server node 224 receives data and/or instructions 235,237 (see FIG. 7) from one or more other servers such as the first and second content providers 234, 236 (or perhaps the client nodes 230 themselves).

In step 256, the secondary server node 224 receives multiple service requests 244 from the client nodes 230 and provides multiple service responses 246 to the client nodes 230. For some applications, the response 246 to each client node 230 is different (e.g., when playing particular games or providing selected advertisements).

Since the secondary server node 224 serviced the requests directly, there is no need for intervention by the primary server node 222. Accordingly, traffic through the large network portion 240 is reduced and responses are subject to less network delays.

It should be understood that the secondary server node 224 may provide the client node data 239 back to the primary server node 222, or back to the content providers 234,236. Accordingly, the primary server node 222 and content providers 234,236 may revise the operation of the secondary server node by providing instructions or even another mobile agent to the secondary server node to update its operation.

Furthermore, it should be understood that the earlier described authentication techniques can be implemented such that only certain nodes of the network can operate as a front end server. Preferably, the mobile agent provides authentication and authorization tokens 134 (see FIG. 2), so that unauthorized nodes cannot operate as secondary server nodes for the primary server node.

Additionally, it should be understood that the distribution strategy of the mobile agent can be application specific. Examples have been provided showing the mobile agent distributed in response to a service request, and distributed independently of service requests. Another distribution approach is for the executable code of a mobile agent to instruct the intermediate node to redistribute the mobile agent to one or more other nodes of the network. In this case, the mobile agent effectively packs itself up and moves to another node.

Furthermore, in some applications, the mobile agent has access to the file system of the dedicated intermediate node, to neighboring dedicated nodes, and to the request stream directed at the mobile agent's origin server (or explicitly negotiated allies thereof). Accordingly, the mobile agent reads and writes data to the file system. In some respects, there are less client security issues with writing or reading to the file system since the mobile agent operates on an intermediate node rather than the client node.

Equivalents

While we have shown and described several embodiments in accordance with the present invention, it is to be understood that the invention is not limited thereto, but is susceptible to numerous changes and modifications as known to a person skilled in the art and we therefore do not wish to be limited to the details shown and described herein but intend to cover all such changes and modifications as are obvious to one of ordinary skill in the art.

For example, the secondary server nodes have been described as dedicated nodes that are specialized to handle mobile agents. The secondary server nodes may be general purpose computers running software adapted to recognize and use mobile agents similar to how Java applets are used on client nodes. Furthermore, the mobile agents may be distributed throughout nodes of a network such that only certain nodes that are enabled to use the mobile agents use them. Nodes that are not enabled to use the mobile agents may simply ignore them.

What is claimed is:

1. A computer program product for fulfilling service requests in a system of computers that communicate as nodes within a network, the computer program product comprising a computer usable medium having computer readable code thereon, including program code which:

in response to an initial service request that requests a service provided by a primary server node, sends a mobile agent from the primary server node to an intermediate node, the mobile agent indicating to the intermediate node that a secondary server node is capable of providing the service;

intercepts, at the intermediate node, a subsequent service request sent from a client node to the primary server node, the subsequent service request requesting the service, and sends an instruction from the intermediate node to the secondary server node, the instruction instructing the secondary server node to provide the service; and in response to the instruction, provides the service from the secondary server node to the client node.

2. The computer program product of claim 1 wherein the program code:

in response to the initial service request, provides the service from the primary server node, through the intermediate node, to a client node that sent the initial service request, the service and the mobile agent being sent from the primary server node to the intermediate node as a service response.

3. The computer program product of claim 1 wherein the mobile agent includes a set of rules for responding to service requests requesting the service and a list of server nodes, and wherein the program code intercepts by:

selecting the secondary server node from the list of server nodes according to the set of rules, each of the server nodes on the list being capable of providing the service.

4. The computer program product of claim 1 wherein the program code:

receives, at the client node, a service response including the service from the secondary server node and a source identifier indicating the primary server node as a source of the service response.

5. The computer program product of claim 1 wherein the initial service request is sent from a first client and the subsequent client request is sent from a second client in the network.

6. A computer program product for responding to service requests, the computer program product comprising a computer usable medium having computer readable code thereon, including program code which:

receives, at a primary server node, an initial service request sent from a client node through an intermediate node, the service request identifying a service provided by the primary server node; and sends a service response from the primary server node to the client node through the intermediate node, the service response including (i) the service to be forwarded by the intermediate node to the client node and (ii) a mobile agent that includes a set of rules directing the intermediate node to instruct a secondary server node to provide the service in response to a subsequent service request.

7. The computer program product of claim 6 wherein the mobile agent further includes a list of server nodes and authorization tokens, and wherein the program code:

queries the server nodes on the list according to the authorization tokens.

8. A computer program product for providing a service in response to service requests, the computer program product comprising a computer usable medium having computer readable code thereon, including program code which:

receives, at an intermediate node, an initial service request sent from a client node to a primary server node that provides the service, and forwards the initial service request to the primary server node;

receives, at the intermediate node, a service response from the primary server node that includes the service and a mobile agent, and forwards the service to the client node, the mobile agent including a list of server nodes and a set of rules directing the intermediate node to instruct a particular server node on the list to provide the service in response to subsequent service requests, the particular server node being different than the primary server node; and receives, at the intermediate node, a subsequent service request that requests the service provided by the primary server node, and sends an instruction to the particular server node instructing the particular server node to provide the service in response to the subsequent service request.

9. The computer program product of claim 8 wherein the program code:

queries the particular server node periodically to obtain server node data from the particular server node; and applies the set of rules on the server node data to determine future operations.

10. A computer program product for fulfilling service requests in a system of computers that communicate as nodes within a network, the computer program product comprising a computer usable medium having computer readable code thereon, including program code which:

receives, at a secondary server node, a mobile agent from a primary server node; and in response to multiple service requests from multiple client nodes, executes code of the mobile agent at the secondary server node to provide multiple service responses to the multiple client nodes, the multiple service responses including a first service response having a first content for a first client node and a second service response having a second content for a second client node, the first and second contents being different from each other.

11. The method of claim 10 wherein the code of the mobile agent is a computerized game, and wherein the program code executes the code of the mobile agent by:

providing, to the first client node, a first image as the first content of the first service response; and providing, to the second client node, a second image as the second content of the second service response, the first and second images being different views of a computer simulated environment.

12. The method of claim 10 wherein the program code executes the code of the mobile agent by:

providing, to the first client node, a first advertisement as the first content of the first service response based on client node data; and providing, to the second client node, a second advertisement as the second content of the second service response based on the client node data, the first and second advertisements being different from each other.

13. A computer program product for fulfilling service requests in a system of computers that communicate as nodes within a network, the computer program product comprising a computer usable medium having computer readable code thereon, including program code which:

in response to an initial service request that requests a service provided by a primary server node, sends a mobile agent from the primary server node to an intermediate node, the mobile agent instructing the intermediate node to operate as a front end server;

intercepts, at the intermediate node, a subsequent service request sent from a client node to the primary server node, the subsequent service request requesting the service, and executing instructions to provide at least a portion of the service.

* * * * *